United States Patent
Liao et al.

(10) Patent No.: US 12,367,556 B2
(45) Date of Patent: Jul. 22, 2025

(54) ARTIFICIAL INTELLIGENCE-BASED IMAGE PROCESSING METHOD AND APPARATUS, DEVICE, AND MEDIUM

(71) Applicant: Tencent Technology (Shenzhen) Company Limited, Shenzhen (CN)

(72) Inventors: Jun Liao, Shenzhen (CN); Jianhua Yao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 652 days.

(21) Appl. No.: 17/732,379

(22) Filed: Apr. 28, 2022

(65) Prior Publication Data

US 2022/0253984 A1    Aug. 11, 2022

Related U.S. Application Data

(63) Continuation of application No. PCT/CN2021/092071, filed on May 7, 2021.

(30) Foreign Application Priority Data

Jun. 5, 2020   (CN) .......................... 202010508058.2

(51) Int. Cl.
*G06T 5/70* (2024.01)
*G06T 7/62* (2017.01)
(Continued)

(52) U.S. Cl.
CPC .................. *G06T 5/70* (2024.01); *G06T 7/62* (2017.01); *H04N 23/80* (2023.01);
(Continued)

(58) Field of Classification Search
CPC ... G06T 5/70; G06T 7/62; G06T 2207/10056; G06V 10/24; G06V 20/69; G06V 20/695;
(Continued)

(56) References Cited

U.S. PATENT DOCUMENTS

| 2002/0036824 A1 | 3/2002 | Sasaki |
| 2006/0209399 A1 | 9/2006 | Mikuriya et al. |

(Continued)

FOREIGN PATENT DOCUMENTS

| CN | 102520507 A | 6/2012 |
| CN | 103744172 A | 4/2014 |

(Continued)

OTHER PUBLICATIONS

Tencent Technology, ISR, PCT/CN2021/092071, Aug. 11, 2021, 2 pgs.

(Continued)

*Primary Examiner* — Molly Wilburn
(74) *Attorney, Agent, or Firm* — Morgan, Lewis & Bockius LLP

(57) ABSTRACT

A computer device obtains a confocal microscopy image. The device determines a pinhole diameter of a first detector pinhole of a confocal microscope that is used to acquire the image. The pinhole diameter has an influence on a parameter of the image. The device obtains a target image processing model corresponding to the pinhole diameter of the first detector pinhole. The target image processing model is configured to improve the parameter of the image. The device causes the target image processing model to process the image to obtain a target image having the improved parameter.

20 Claims, 7 Drawing Sheets

(51) Int. Cl.
  *H04N 23/80* (2023.01)
  *H04N 23/951* (2023.01)
  *H04N 23/955* (2023.01)

(52) U.S. Cl.
  CPC ......... *H04N 23/951* (2023.01); *H04N 23/955* (2023.01); *G06T 2207/10056* (2013.01)

(58) Field of Classification Search
  CPC .... H04N 23/80; H04N 23/951; H04N 23/955; H04N 23/73; G02B 21/0076; G02B 21/0032; G02B 21/365
  See application file for complete search history.

(56) References Cited

U.S. PATENT DOCUMENTS

| | | | |
|---|---|---|---|
| 2014/0071260 A1 | 3/2014 | McCluskey | |
| 2018/0113292 A1 | 4/2018 | Novikau et al. | |
| 2019/0333199 A1* | 10/2019 | Ozcan | G06T 5/70 |
| 2019/0355106 A1 | 11/2019 | Toussaint et al. | |

FOREIGN PATENT DOCUMENTS

| | | |
|---|---|---|
| CN | 206627441 U | 11/2017 |
| CN | 108231511 A | 6/2018 |
| CN | 111091132 A | 5/2020 |
| CN | 111711750 A | 9/2020 |
| DE | 102017105719 A1 | 9/2018 |
| JP | 2010014839 A | 1/2010 |
| JP | 2019212050 A | 12/2019 |
| KR | 20150146075 A | 12/2015 |
| WO | WO 0067060 A1 | 11/2000 |

OTHER PUBLICATIONS

Youhua Chen et al., "A Novel Method for Enhancing the Lateral Resolution and Image SNR in Confocal Microscopy", Optics Communications, vol. 404, Dec. 1, 2017, XP093002167, 5 pgs.
Tencent Technology, Extended European Search Report and Supplementary Search Report, EP21817274.0, Dec. 9, 2022, 10 pgs.
Tencent Technology, WO, PCT/CN2021/092071, Aug. 11, 2021, 5 pgs.
Tencent Technology, IPRP, PCT/CN2021/092071, Dec. 6, 2022, 6 pgs.

* cited by examiner

ARTIFICIAL INTELLIGENCE-BASED IMAGE PROCESSING METHOD AND APPARATUS, DEVICE, AND MEDIUM

CROSS-REFERENCE TO RELATED APPLICATIONS

This application is a continuation application of PCT Patent Application No. PCT/CN2021/092071, entitled "ARTIFICIAL INTELLIGENCE-BASED IMAGE PROCESSING METHOD, APPARATUS, DEVICE, AND MEDIUM" filed on May 7, 2021, which claims priority to Chinese Patent Application No. 202010508058.2, filed with the State Intellectual Property Office of the People's Republic of China on Jun. 5, 2020, and entitled "ARTIFICIAL INTELLIGENCE-BASED IMAGE PROCESSING METHOD AND APPARATUS, DEVICE, AND MEDIUM", all of which are incorporated herein by reference in their entirety.

FIELD OF THE TECHNOLOGY

This application relates to the field of optical technologies, and in particular, to an artificial intelligence (AI)-based image processing method and apparatus, a server, and a computer-readable storage medium.

BACKGROUND OF THE DISCLOSURE

Confocal microscopy imaging technology is an optical imaging technology that uses point-by-point scanning illumination with spatial pinhole filtering to remove scattered light outside a focal plane of a sample. Compared with conventional optical imaging methods, confocal microscopy imaging can improve an optical resolution and visual contrast. A confocal microscope mainly includes a confocal laser scanning microscope, a spinning disk confocal microscope, a programmable array microscope, or the like.

In structure, a pair of conjugate pinholes, namely a light source pinhole and a detector pinhole, are added to the confocal microscope based on an ordinary wide-field microscope. During operation, the confocal microscope illuminates only one spot on the sample at a time and eliminates interference from light outside the focal plane by using the detector pinhole. The confocal microscope can achieve higher resolution and better tomographic capabilities than the ordinary wide-field fluorescence microscope through point-by-point scanning in x-, y-, and z-directions.

A larger detector pinhole allows more light to enter the detector, and a signal-to-noise ratio of a confocal microscopy image acquired by the confocal microscope is increased (e.g., higher). However, the confocal microscope has poorer capability to eliminate a fluorescent signal from the sample outside the focal plane. As a result, the resolution of the confocal microscopy image is reduced. In contrast, a smaller detector pinhole indicates that the confocal microscope has stronger capability to eliminate the fluorescent signal from the sample outside the focal plane. However, the light entering the detector is significantly reduced. As a result, the signal-to-noise ratio of the confocal microscopy image is reduced. The above problems cause one of the resolution or the signal-to-noise ratio of the confocal microscopy image acquired by the confocal microscope to be relatively low, so that the details of the sample cannot be accurately determined.

SUMMARY

Embodiments of this application provide an AI-based image processing method and apparatus, a device, and a medium, which may improve both a resolution and a signal-to-noise ratio of a confocal microscopy image and can more accurately reflect details of a sample. The technical solutions are as follows.

According to one aspect, an AI-based image processing method is provided, performed by a computer device, the method including:

obtaining a confocal microscopy image acquired by a confocal microscope; determining a pinhole diameter of a first detector pinhole of the confocal microscope in a usage state (e.g., when the image is acquired), wherein the pinhole diameter has an influence on a parameter of the image (e.g., a resolution of the image, a signal-to-noise-ratio of the image, etc.);

obtaining a target image processing model corresponding to the pinhole diameter of the first detector pinhole, the target image processing model being configured to: (i) improve a resolution of an image when the resolution of the image is reduced and a signal-to-noise ratio of the image is improved due to the influence of a determined pinhole diameter, and/or (ii) to improve the signal-to-noise ratio of the image when the signal-to-noise ratio of the image is reduced and the resolution of the image is improved due to the influence of the determined pinhole diameter; and causing the target image processing model to process the confocal microscopy image acquired by the confocal microscope (e.g., by invoking or executing the target image processing model on the computer device), to obtain a target image.

According to another aspect, an AI-based image processing apparatus is provided. The apparatus includes:

a determining module, configured to determine a pinhole diameter of a first detector pinhole of a confocal microscope in a usage state;

a model obtaining module, configured to obtain a target image processing model corresponding to the pinhole diameter of the first detector pinhole, the target image processing model being configured to improve a resolution of an image when the resolution of the image is reduced and a signal-to-noise ratio of the image is improved due to the influence of a determined pinhole diameter, and the target image processing model being configured to improve the signal-to-noise ratio of the image when the signal-to-noise ratio of the image is reduced and the resolution of the image is improved due to the influence of the determined pinhole diameter; and a model invoking module, configured to invoke the target image processing model to process a confocal microscopy image acquired by the confocal microscope, to obtain a target image.

According to another aspect, an AI-based image processing system is provided, including: a confocal microscope and a computer device, the confocal microscope being configured to acquire a confocal microscopy image; and the computer device being configured to determine a pinhole diameter of a first detector pinhole of the confocal microscope in a usage state (e.g., the confocal microscope is used to acquire one or more confocal microscopy images);

the computer device being further configured to obtain a target image processing model corresponding to the pinhole diameter of the first detector pinhole, the target image processing model being configured to improve a resolution of an image when the resolution of the image is reduced and a signal-to-noise ratio of the image is improved due to the influence of a determined pinhole diameter, and the target image processing model being configured to improve the signal-to-noise ratio of the image when the signal-to-noise ratio of the image is reduced and the resolution of the image is improved due to the influence of the determined pinhole diameter; and the computer device being further configured to invoke the target image processing model to process the confocal microscopy image acquired by the confocal microscope, to obtain a target image.

According to another aspect, a computer device is provided, including a processor and a memory, the memory being configured to store at least one program code, the at least one program code being loaded and executed by the processor, to implement operations performed in the AI-based image processing method according to the embodiments of this application.

According to another aspect, a non-transitory computer-readable storage medium is provided, the storage medium storing at least one program code, the at least one program code being configured to implement the AI-based image processing method according to the embodiments of this application.

According to another aspect, an application program product is provided, storing one or more instructions, the one or more instructions being executed by a processor of a computer device to implement the AI-based image processing method.

BRIEF DESCRIPTION OF THE DRAWINGS

To describe technical solutions in embodiments of this application more clearly, the following briefly introduces accompanying drawings required for describing the embodiments. Apparently, the accompanying drawings in the following description show merely some embodiments of this application, and a person of ordinary skill in the art may still derive other accompanying drawings according to the accompanying drawings without creative efforts.

DESCRIPTION OF EMBODIMENTS

Figure 1:
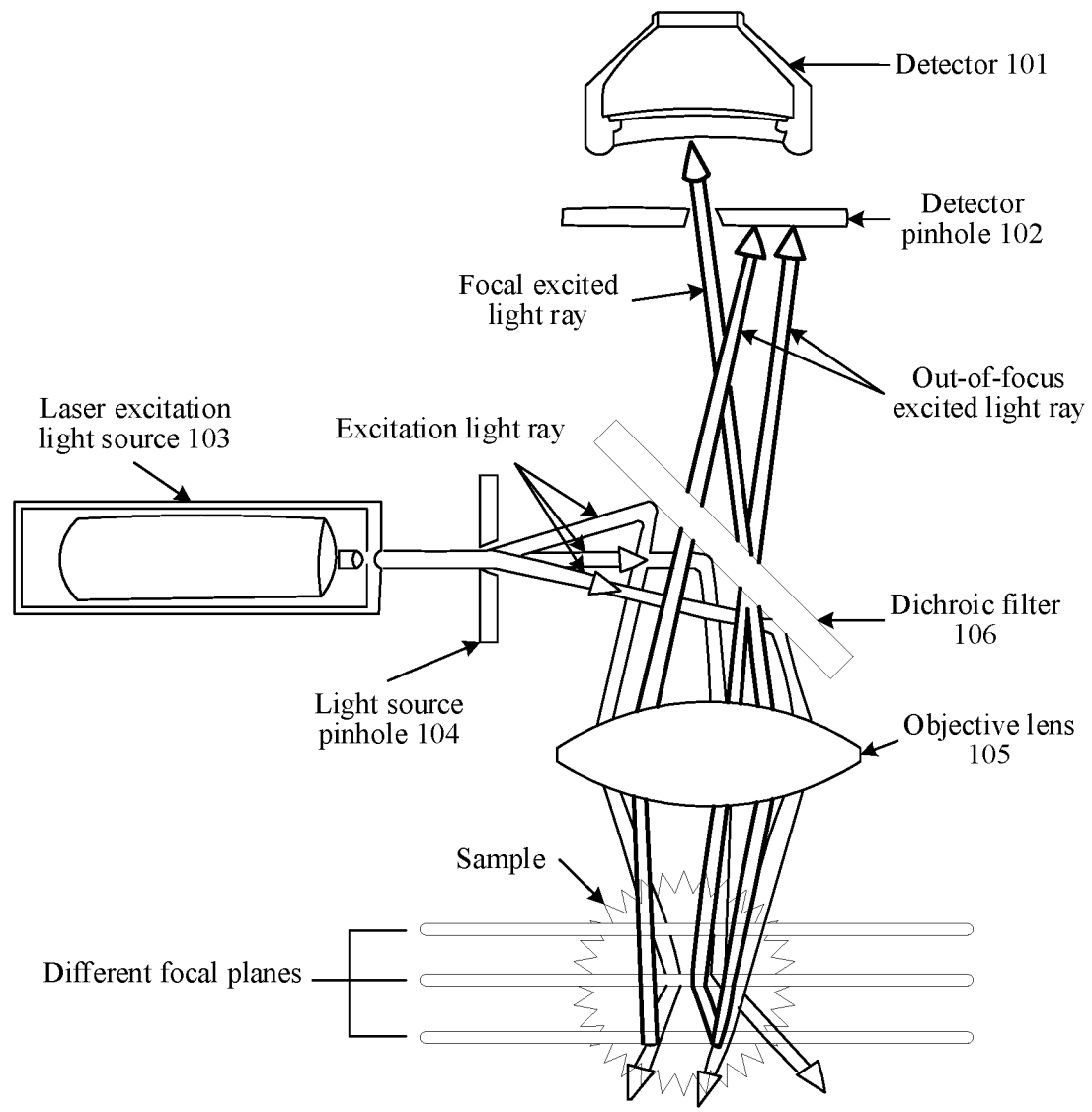
FIG. 1 is a partial schematic structural diagram of a confocal microscope according to an embodiment of this application.

To make objectives, technical solutions, and advantages of this application clearer, the following further describes implementations of this application in detail with reference to the accompanying drawings.

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations that are consistent with this application. On the contrary, the implementations are merely examples of devices and methods that are described in detail in the appended claims and that are consistent with some aspects of this application.

The following briefly introduces technologies that may be used in the embodiments of this application.

AI is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology of computer sciences, attempts to understand essence of intelligence, and produces a new intelligent machine that can react in a manner similar to human intelligence. AI is to study design principles and implementation methods of various intelligent machines, to enable the machines to have functions of perception, reasoning, and decision-making.

AI cloud service is also generally referred to as AI as a service (AIaaS). This is the current mainstream service manner of AI platforms. Specifically, the AIaaS platform splits several types of common AI services and provides independent or packaged services in a cloud. Such a service model is similar to opening an AI-themed mall: all developers can access one or more AI services provided in a platform through API interfaces, and some senior developers may also deploy and operate dedicated cloud AI services of the developers by using an AI framework and AI infrastructure provided in the platform.

Computer vision (CV) technologies is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, CV studies related theories and technologies and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biometric feature recognition technologies such as common face recognition and fingerprint recognition.

Machine Learning (ML) is a multi-field interdiscipline, and relates to a plurality of disciplines such as the probability theory, statistics, the approximation theory, convex analysis, and the algorithm complexity theory. The machine learning specializes in studying how a computer simulates or implements a human learning behavior to obtain new knowledge or skills, and reorganize an existing knowledge structure, so as to keep improving performance of the computer. The ML, as the core of AI, is a basic way to make the computer intelligent, and is applicable to various fields of AI. ML and deep learning generally include technologies such as an artificial neural network, a belief network, reinforcement learning, transfer learning, inductive learning, and learning from demonstrations.

Confocal microscopy technology is an optical imaging technology that uses point-by-point scanning illumination with spatial pinhole filtering to remove out-of-plane scattered light at a detected point on a sample.

The following is a brief introduction to a confocal microscope.

The confocal microscope is a microscope constructed based on confocal microscopy technology, which can be used for the study of cell morphological positioning, three-dimensional structure reorganization, dynamic change process and the like, and is widely applied in the fields of molecular and cell biology such as morphology, physiology, immunology, and genetics. For part of a structure of the confocal microscope, reference may be made to FIG. 1, in which a detector 101, a detector pinhole 102, a laser excitation light source 103, a light source pinhole 104, an objective lens 105, and a dichroic filter 106 are included. As shown in FIG. 1, a light emitted by the laser excitation light source 103 first passes through the tiny light source pinhole 104, and then passes through the dichroic filter 106 and the objective lens 105, and is focused to a point on one of planes of a three-dimensional sample. A focal point of excitation light includes excited light rays emitted uniformly after fluorescent proteins above and below the focal point of the excitation light are excited. Some of the excited light rays are from a focal plane, and some are from an out-of-focus plane. The excited light rays are filtered by the detector pinhole 102 after passing through the objective lens 105 and the dichroic filter 106. That is, the excited light rays from the focal plane are captured by the detector 101 through the detector pinhole 102, and the excited light rays from the out-of-focus plane are blocked by the detector pinhole 102. Because the pinhole of the confocal microscope can eliminate the light outside the focal plane and only detect the light on the focal plane, the confocal microscope can obtain an image with higher resolution and better tomographic effect than an ordinary fluorescence wide-field microscope.

The confocal microscope may further be connected to a computer device, an image output device, and the like.

The following briefly introduces the implementation environment in the embodiments of this application.

Figure 2:
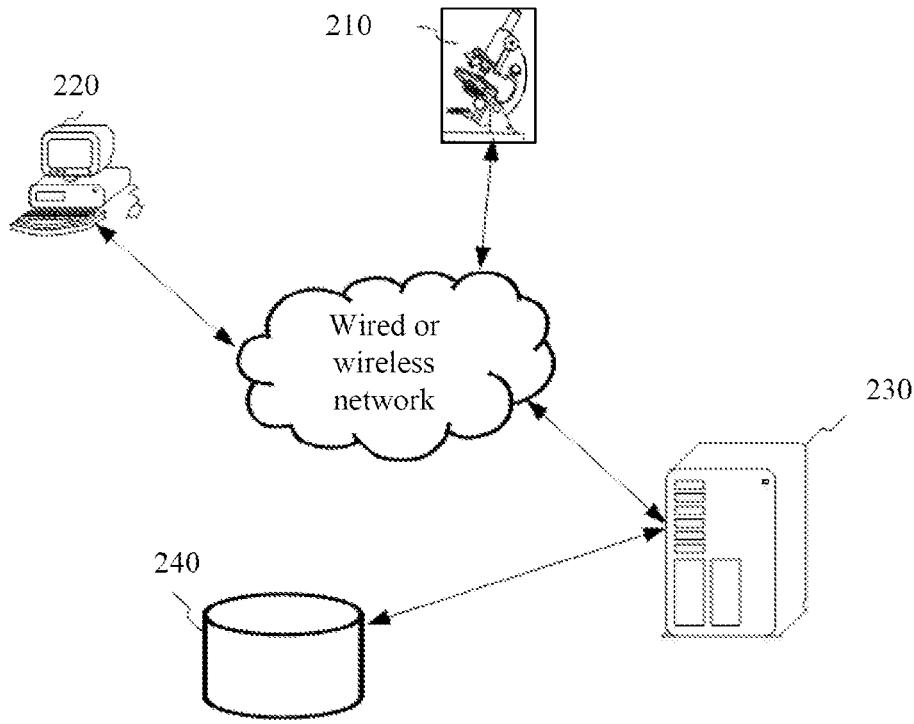
FIG. 2 is a schematic diagram of an AI-based image processing system according to an embodiment of this application.

The embodiments of this application provide an AI-based image processing method, which may be applied to a scene of processing a microscopy image acquired by a confocal microscope. Due to the tradeoff between a resolution and a signal-to-noise ratio of the confocal microscopy image acquired by the confocal microscope, that is, a confocal microscopy image with high-resolution has a low signal-to-noise ratio, while a confocal microscopy image with high signal-to-noise ratio has a low (e.g., poor) resolution, in the image processing method provided in the embodiments of this application, both the signal-to-noise ratio and the resolution of the confocal microscopy image can be improved, to obtain a confocal microscopy image with high resolution and high signal-to-noise ratio. FIG. 2 is a schematic diagram of an AI-based image processing system according to an embodiment of this application. The image processing system may include a confocal microscope 210 and a computer device 220. The image processing system may further include a server 230 and a database 240.

The confocal microscope 210 may externally provide with an image output interface for transmitting an acquired confocal microscopy image to the computer device 220 or the server 230. The image output interface may be a wired interface such as a universal serial bus (USB), a high-definition multimedia interface (HDMI), or an Ethernet interface; or, the image output interface may alternatively be a wireless interface such as a wireless local area network (WLAN) interface or a Bluetooth interface. Correspondingly, according to different types of the image output interfaces, there are many manners to transmit the confocal microscopy image. For example, the acquired confocal microscopy image is transmitted to the computer device 220 in a wired or short-distance wireless manner, or, the computer device 220 transmits the received confocal microscopy image to the server 230, or the acquired confocal microscopy image is transmitted to the computer device 220 or the server 230 through a local area network (LAN) or the Internet.

The computer device 220 may be a smartphone, a tablet computer, a notebook computer, a desktop computer, a smartwatch, or the like, but is not limited thereto. An application program may be installed and run on the computer device 220 to process the obtained confocal microscopy image. After obtaining the confocal microscopy image, the computer device 220 may process the confocal microscopy image by using the application program, and transmit a processing result to the confocal microscope 210, for the confocal microscope 210 to display the processing result, or transmit the processing result to a display device for display.

The computer device 220 and the confocal microscope 210 may be distinct devices (e.g., physically separate), or may be integrated into a single physical device. For example, the confocal microscope 210 may be an intelligent microscope with computing capabilities of the computer device 220.

The server 230 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an AI platform.

The computer device 220 and the server 230 may be directly or indirectly connected in a wired or wireless communication manner. This is not limited in this application.

The server 230 may be configured to provide an image processing service for the computer device 220. The server 230 is responsible for primary image processing work, and the computer device 220 is responsible for secondary image processing work; or, the server 230 is responsible for secondary image processing work, and the computer device 220 is responsible for primary image processing work; or, the server 230 or the computer device 220 may separately undertake image processing work. The server 230 may also be directly connected to the confocal microscope 210 to perform image processing on the confocal microscopy image acquired by the confocal microscope 210.

The database 240 may be a Redis database or another type of database. The database 240 is configured to store various data.

A standard communication technology and/or protocol is used for the wireless network or the wired network described above. The network is generally the Internet, but may be any network, including, but not limited to, any combination of a LAN, a metropolitan area network (MAN), a wide area network (WAN), a mobile, wired, or wireless network, and a dedicated network or a virtual private network. In some embodiments, technologies and/or formats such as the HyperText Markup Language (HTML) and the Extensible Markup Language (XML) are used for representing data exchanged through the network. In addition, all or some links may be encrypted by using conventional encryption technologies such as a secure socket layer (SSL), transport layer security (TLS), a virtual private network (VPN), and internet protocol security (IPsec). In some other embodiments, custom and/or dedicated data communication technologies may also be used in place of or in addition to the foregoing data communication technologies.

Figure 3:
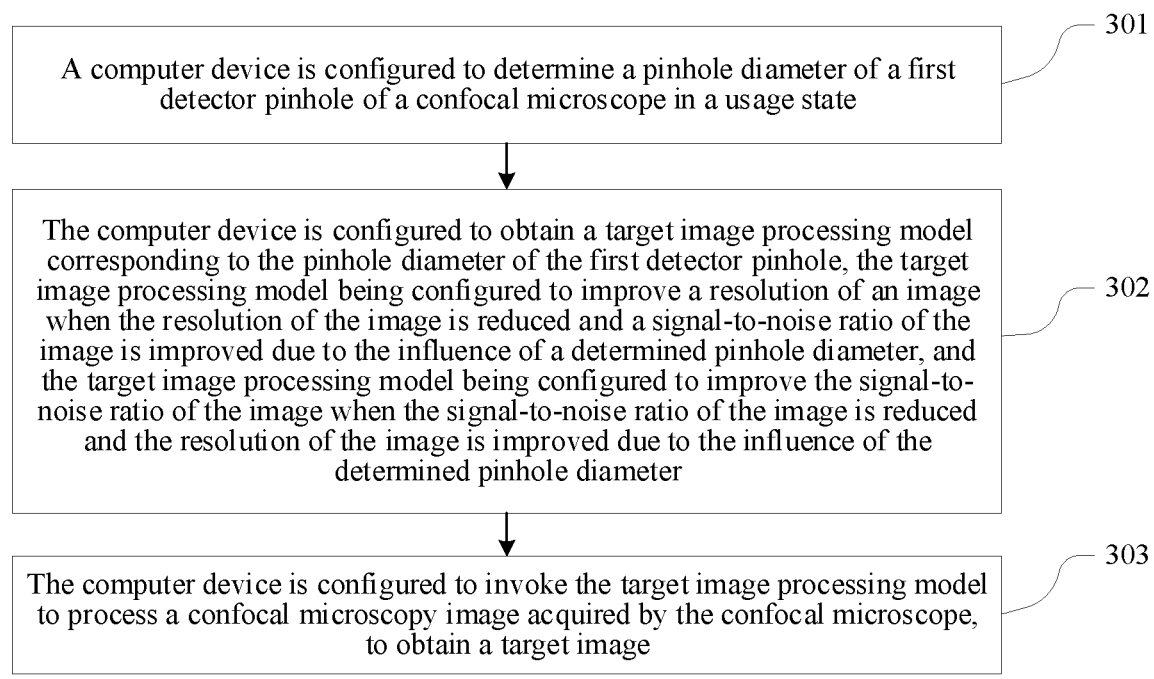
FIG. 3 is a flowchart of an AI-based image processing method according to an embodiment of this application.

FIG. 3 is a flowchart of an AI-based image processing method according to an embodiment of this application. The image processing method may be performed by a computer device. The computer device may be a single device integrated with confocal microscope functions; or, the computer device may alternatively be the computer device 220 shown in FIG. 2, that is, the method may be performed interactively by the confocal microscope 210 and the computer device 220 shown in FIG. 2. As shown in FIG. 3, the AI-based image processing method includes the following steps:

301. The computer device is configured to determine a pinhole diameter of a first detector pinhole of a confocal microscope in a usage state.

In this embodiment of this application, one confocal microscope may be provided with a detector pinhole with only one type of pinhole diameter, and different confocal microscopes may be provided with detector pinholes with different pinhole diameters; or, one confocal microscope may be provided with a detector pinhole of two or more pinhole diameters. A larger pinhole diameter of the detector pinhole allows more light to enter a detector, and a signal-to-noise ratio of an acquired confocal microscopy image is higher, but a resolution of the confocal microscopy image is reduced. A smaller detector pinhole allows less light to enter the detector. For the same exposure time, the resolution of the acquired confocal microscopy image is higher, but the signal-to-noise ratio is reduced. Although increasing the exposure time may improve the signal-to-noise ratio to some extent, the phototoxicity of a laser at long exposures may cause bleaching of fluorescence of a sample.

302. The computer device is configured to obtain a target image processing model corresponding to the pinhole diameter of the first detector pinhole, the target image processing model being configured to: (i) improve a resolution of an image when the resolution of the image is reduced and a signal-to-noise ratio of the image is improved due to the influence of a determined pinhole diameter, and/or (ii) improve the signal-to-noise ratio of the image when the signal-to-noise ratio of the image is reduced and the resolution of the image is improved due to the influence of the determined pinhole diameter.

In this embodiment of this application, an image processing model corresponding to the pinhole diameter may be determined according to the pinhole diameter of the detector pinhole. If the pinhole diameter affects the resolution of the confocal microscopy image, the image processing model obtained through the pinhole diameter is a model configured to improve the resolution of the confocal microscopy image; and if the pinhole diameter affects the signal-to-noise ratio of the confocal microscopy image, the image processing model obtained through the pinhole diameter is a model configured to improve the signal-to-noise ratio of the confocal microscopy image.

303. The computer device is configured to invoke (e.g., cause, execute etc.) the target image processing model to process a confocal microscopy image acquired by the confocal microscope, to obtain a target image.

In this embodiment of this application, the computer device may invoke the obtained image processing model to process the confocal microscopy image, to improve the resolution and the signal-to-noise ratio of the confocal microscopy image. The foregoing image processing manner enables the confocal microscopy image to have higher resolution and signal-to-noise ratio after being processed, and can more accurately reflect the details of the sample.

In this embodiment of this application, the detector pinhole with different diameters is configured for the confocal microscope, during image acquisition, the corresponding target image processing model may be selected for the pinhole diameter of the first detector pinhole in the usage state. Because the detector pinhole with different pinhole diameters can improve one of the resolution or the signal-to-noise ratio and reduce the other, when the resolution of the image is reduced and the signal-to-noise ratio of the image is improved due to the influence of the determined pinhole diameter, the target image processing model is used to process the confocal microscopy image, to improve the resolution of the image, so that both the resolution and the signal-to-noise ratio of the processed confocal microscopy image are improved, which can more accurately reflect the details of the sample. In another embodiment, when the signal-to-noise ratio of the image is reduced and the resolution of the image is improved due to the influence of the determined pinhole diameter, the target image processing model is used to process the confocal microscopy image, to improve the signal-to-noise ratio of the image, so that both the resolution and the signal-to-noise ratio of the processed confocal microscopy image are improved. In this case, the details of the sample can also be more accurately reflected.

Figure 4:
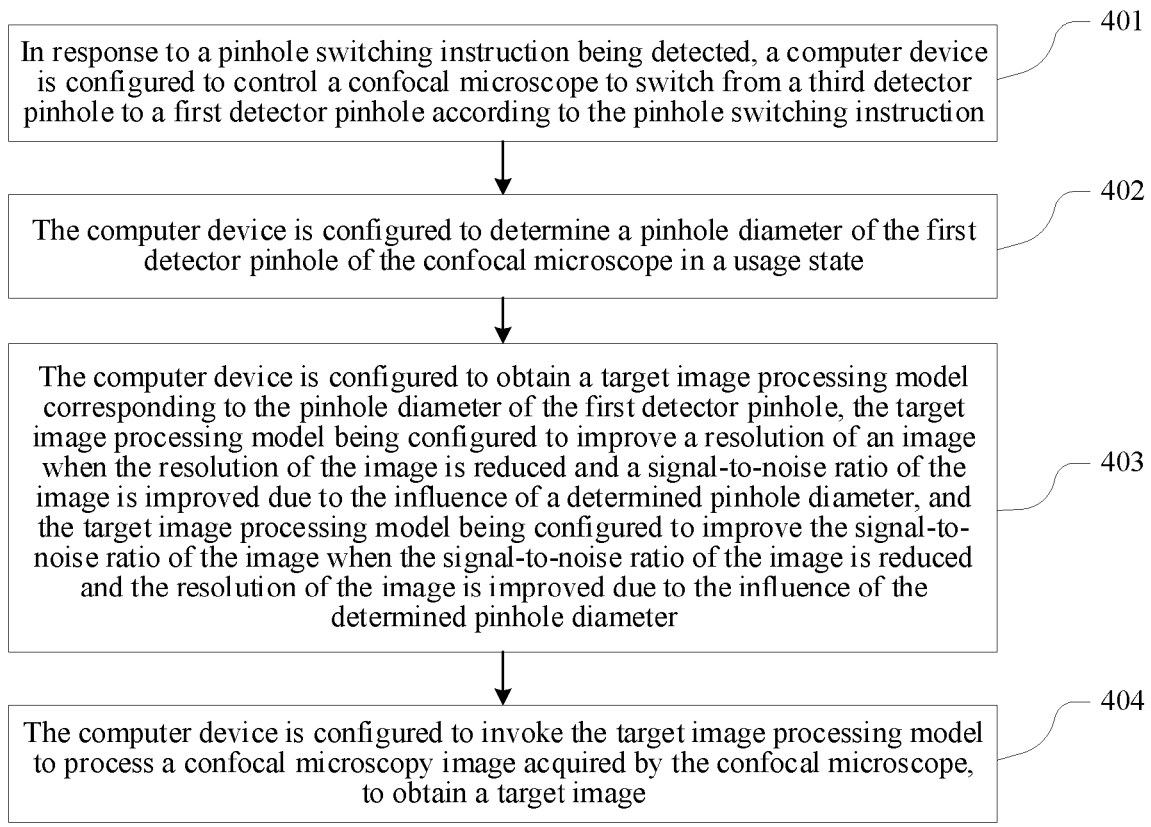
FIG. 4 is a flowchart of another AI-based image processing method according to an embodiment of this application.

FIG. 4 is a flowchart of another AI-based image processing method according to an embodiment of this application. The image processing method may be performed by a computer device. The computer device may be a single device integrated with confocal microscope functions; or, the computer device may alternatively be the computer device 220 shown in FIG. 2, that is, the method may be performed interactively by the confocal microscope 210 and the computer device 220 shown in FIG. 2. As shown in FIG. 4, the AI-based image processing method includes the following steps:

401. In response to a pinhole switching instruction being detected, the computer device is configured to control the confocal microscope to switch from a third detector pinhole to a first detector pinhole according to the pinhole switching instruction.

In this embodiment of this application, the confocal microscope may be provided with a detector pinhole of at least two pinhole diameters. A user may switch the detector pinhole with different pinhole diameters in a mechanical rotation manner through a pinhole switching operation; or may trigger the pinhole switching instruction through a pinhole switching operation, and the computer device controls the confocal microscope to switch the detector pinhole according to the pinhole switching instruction. For ease of description, the detector pinhole obtained before switching is referred to as the third detector pinhole, and the detector pinhole obtained after switching is referred to as the first detector pinhole. That is, after the switching is completed, the first detector pinhole is a detector pinhole of the confocal microscope in a usage state.

402. The computer device is configured to determine the pinhole diameter of the first detector pinhole of the confocal microscope in a usage state.

In this embodiment of this application, the computer device may obtain the pinhole diameter of the first detector pinhole currently in the usage state after the detector pinhole is switched.

When the pinhole diameter of the detector pinhole is the same as a diameter of an Airy disk, about 84% of a light may be focused to a detector, so that a signal-to-noise ratio of an image is better. Therefore, the computer device may use the diameter of the Airy disk as a target threshold, and select a corresponding target image processing model according to a relationship between the pinhole diameter of the first detector pinhole and the target threshold. The Airy disk is a spot of light formed at a focal point due to diffraction when a point light source is imaged through a diffraction-limited lens. The center of the spot of light is a bright circular spot, surrounded by a group of alternately weaker light and dark concentric annular stripes, and a central bright spot defined by a first dark ring is referred to as the Airy disk.

403. The computer device is configured to obtain a target image processing model corresponding to the pinhole diameter of the first detector pinhole, the target image processing model being configured to improve a resolution of an image when the resolution of the image is reduced and a signal-to-noise ratio of the image is improved due to the influence of a determined pinhole diameter, and the target image processing model being configured to improve the signal-to-noise ratio of the image when the signal-to-noise ratio of the image is reduced and the resolution of the image is improved due to the influence of the determined pinhole diameter.

In this embodiment of this application, when (e.g., in accordance with a determination that) the pinhole diameter of the first detector pinhole is less than the target threshold, it indicates that the resolution is improved by sacrificing the signal-to-noise ratio. In this case, the target image processing model configured to improve the signal-to-noise ratio of the image needs to be used to compensate the signal-to-noise ratio. When (e.g., in accordance with a determination that) the pinhole diameter of the first detector pinhole is greater than the target threshold, it indicates that the signal-to-noise ratio is improved by sacrificing the resolution. In this case, the target image processing model configured to improve the resolution of the image needs to be used to compensate the resolution.

In an implementation, in accordance with a determination that the pinhole diameter of the first detector pinhole is less than the target threshold, the computer device may obtain, from at least one first image processing model configured to improve a signal-to-noise ratio, a first image processing model corresponding to the pinhole diameter of the first detector pinhole, and use the first image processing model as the target image processing model. Because a resolution of a confocal microscopy image is improved by reducing the pinhole diameter of the detector pinhole, the confocal microscopy image may be further processed by the first image processing model configured to improve the signal-to-noise ratio to improve both the resolution and the signal-to-noise ratio of the image.

In an implementation, in accordance with a determination that the pinhole diameter of the first detector pinhole is greater than the target threshold, the computer device may obtain, from at least one second image processing model configured to improve a resolution, a second image processing model corresponding to the pinhole diameter of the first detector pinhole, and use the second image processing model as the target image processing model. Because the signal-to-noise ratio of the confocal microscopy image is improved by enlarging the pinhole diameter of the detector pinhole, the confocal microscopy image may be further processed by the second image processing model configured to improve the resolution to improve both the resolution and the signal-to-noise ratio of the image.

The target image processing model may be the first image processing model configured to improve the signal-to-noise ratio of the image, or the second image processing model configured to improve the resolution of the image. However, a training manner of the first image processing model is different from that of the second image processing model, and the training manners are as follows.

In an implementation, when the target image processing model is used as the first image processing model configured to improve the signal-to-noise ratio of the image, a step of obtaining the target image processing model through training by the computer device may be that: the computer device obtains a first sample image pair, the first sample image pair including images of a same resolution obtained by respectively acquiring samples in a same field of view by using the first detector pinhole under different light source conditions, and the light source condition including at least one of brightness of a light source or an exposure time. The computer device may input the first sample image pair into a to-be-trained image processing model, to obtain an outputted processing result. In response to a training ending condition being satisfied, the computer device may use the image processing model obtained through training as the target image processing model. The pinhole diameter of the first detector pinhole is smaller than a pinhole diameter of a reference detector pinhole commonly used in the industry. In this embodiment of this application, the diameter of the Airy disk is used as the pinhole diameter of the reference detector pinhole. The first sample image pair is obtained by sampling samples in the same field of view using the first detector pinhole under different light source conditions, and the image processing model is trained according to a difference in the signal-to-noise ratios between the images with the same resolution in the first sample image pair, so that the image processing model obtained through training can improve the signal-to-noise ratio of the image.

For example, the light source remains unchanged, the exposure time is 200 ms, and an image A is acquired based on the first detector pinhole. The exposure time is adjusted to 400 ms, and an image B is acquired based on the first detector pinhole. Because the same first detector pinhole is used, resolutions of the image A and the image B are the same. Because the exposure time of acquiring the image B is longer, a signal-to-noise ratio of the image B is greater than a signal-to-noise ratio of the image A. The image A and the image B are used as the first sample image pair, and are inputted into the image processing model for training, to obtain the first image processing model configured to improve the signal-to-noise ratio of the image. In the foregoing method, without increasing the exposure time, the first image processing model may increase the signal-to-noise ratio of the image acquired during a short exposure time to be close to the signal-to-noise ratio of the image acquired during a long exposure time. Similarly, when the exposure time remains unchanged, by adjusting brightness of the light source, the first sample image pair with the same resolution and different signal-to-noise ratios may also be obtained, and details are not described herein again.

Figure 5:
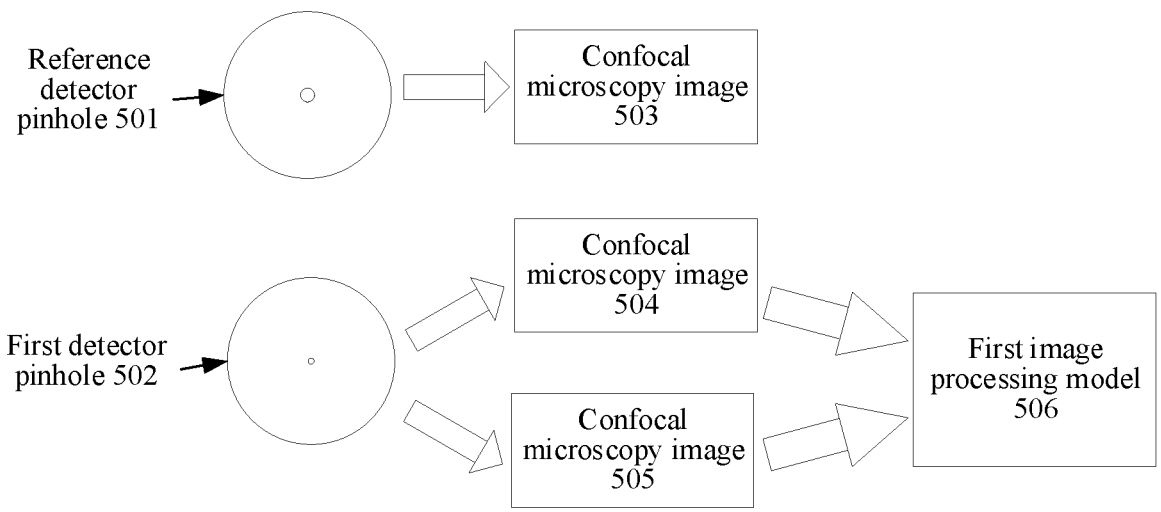
FIG. 5 shows a first image processing model trained for improving a signal-to-noise ratio of an image according to an embodiment of this application.

Correspondingly, FIG. 5 is a schematic flowchart of a first image processing model trained for improving a signal-to-noise ratio of an image according to an embodiment of this application. As shown in FIG. 5, a pinhole diameter of a reference detector pinhole 501 is greater than a pinhole diameter of a first detector pinhole 502. In the same light source and exposure time, based on the reference detector pinhole 501, a confocal microscopy image 503 may be acquired, and based on the first detector pinhole 502, a confocal microscopy image 504 may be acquired. A resolution of the confocal microscopy image 504 is greater than that of the confocal microscopy image 503, and a signal-to-noise ratio of the confocal microscopy image 504 is lower than that of the confocal microscopy image 503. By increasing at least one of the brightness of the light source or the exposure time, based on the first detector pinhole 502, a confocal microscopy image 505 may further be acquired, and a resolution of the confocal microscopy image 505 is the same as the resolution of the confocal microscopy image 504, and a signal-to-noise ratio of the confocal microscopy image 505 is greater than the signal-to-noise ratio of the confocal microscopy image 504. The confocal microscopy image 505 and the confocal microscopy image 504 are used as the first sample image pair and are inputted into a first image processing model 506.

In an implementation, when the target image processing model is used as the second image processing model configured to improve the resolution of the image, a step of obtaining the target image processing model through training by the computer device may be that: the computer device obtains a second sample image pair, the second sample image pair including images of a same signal-to-noise ratio obtained by respectively acquiring samples in a same field of view by using the first detector pinhole and the second detector pinhole under different light source conditions, the pinhole diameter of the first detector pinhole being greater than a pinhole diameter of the second detector pinhole, and the light source condition including at least one of brightness of a light source or an exposure time. The computer device may input the second sample image pair into a to-be-trained image processing model, to obtain an outputted processing result. In response to a training ending condition being satisfied, the computer device may use the image processing model obtained through training as the target image processing model. The pinhole diameter of the second detector pinhole may be equal to a pinhole diameter of a reference detector pinhole commonly used in the industry, or may be smaller than the pinhole diameter of the reference detector pinhole. The second sample image pair is obtained by sampling samples in the same field of view using the first detector pinhole and the second detector pinhole under different light source conditions, and the image processing model is trained according to a difference in the resolutions between the images with the same signal-to-noise ratio in the second sample image pair, so that the image processing model obtained through training can improve the resolution of the image.

For example, the pinhole diameter of the second detector pinhole is equal to the pinhole diameter of the reference detector pinhole commonly used in the industry. The pinhole diameter of the first detector pinhole is twice the pinhole diameter of the second detector pinhole. The light source remains unchanged, the exposure time is 200 ms, and an image C is acquired based on the first detector pinhole. By increasing the exposure time and based on the second detector pinhole, an image D with the same signal-to-noise ratio as the image C is acquired. The pinhole diameter of the first detector pinhole is greater than the pinhole diameter of the second detector pinhole, so that a resolution of the image C is less than a resolution of the image D. The image C and the image D are used as the second sample image pair, and are inputted into the image processing model for training, to obtain the second image processing model configured to improve the resolution of the image. In the foregoing method, without increasing the exposure time, the second image processing model may increase the resolution of the image acquired through a small pinhole diameter to be close to the resolution of the image acquired through a large pinhole diameter. Similarly, when the exposure time remains unchanged, by adjusting the brightness of the light source, the second sample image pair with the same signal-to-noise ratio and different resolutions may also be obtained, and details are not described herein again.

Figure 6:
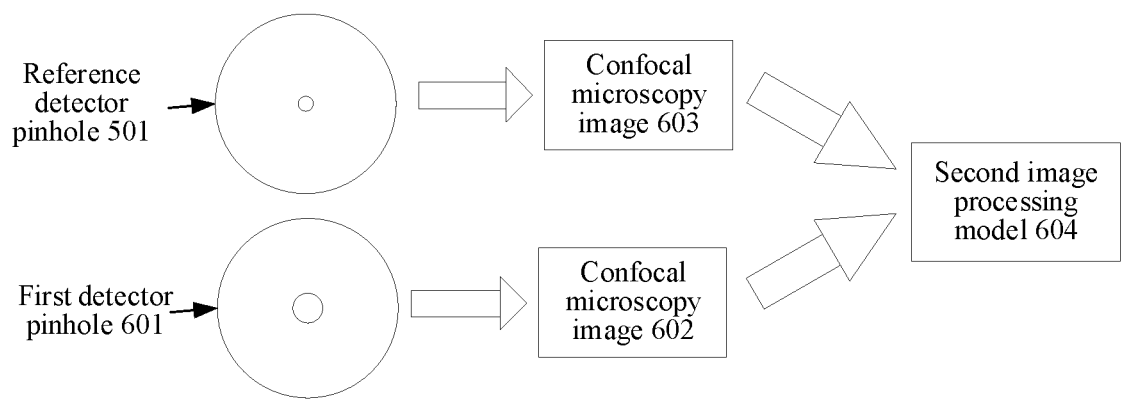
FIG. 6 shows a second image processing model trained for improving a resolution of an image according to an embodiment of this application.

Correspondingly, FIG. 6 shows a second image processing model trained for improving a resolution of an image according to an embodiment of this application. As shown in FIG. 6, the pinhole diameter of the reference detector pinhole 501 is smaller than a pinhole diameter of a first detector pinhole 601. A confocal microscopy image 602 may be acquired according to the first detector pinhole 601. A confocal microscopy image 603 may be acquired based on the reference detector pinhole 501 and by increasing at least one of brightness of a light source or an exposure time. A resolution of the confocal microscopy image 602 is less than that of the confocal microscopy image 603, and a signal-to-noise ratio of the confocal microscopy image 602 is the same as a signal-to-noise ratio of the confocal microscopy image 603. The confocal microscopy image 602 and the confocal microscopy image 603 are used as the second sample image pair and are inputted into a second image processing model 604.

The target image processing model may be a model constructed based on a deep learning network, and the deep learning network may be a generative adversarial network (GAN), a variant of a GAN, a U-shaped image segmentation network (U-Net), a convolutional neural network (CNN), or the like. This is not limited in this embodiment of this application.

404. The computer device is configured to invoke the target image processing model to process the confocal microscopy image acquired by the confocal microscope, to obtain a target image.

In this embodiment of this application, after obtaining the target image processing model corresponding to the pinhole diameter of the first detector pinhole, the computer device may input the confocal microscopy image acquired by the confocal microscope into the target image processing model, for the target image processing model to perform resolution enhancement processing or signal-to-noise ratio enhancement processing on the confocal microscopy image, to obtain the target image with higher resolution and higher signal-to-noise ratio.

Figure 7:
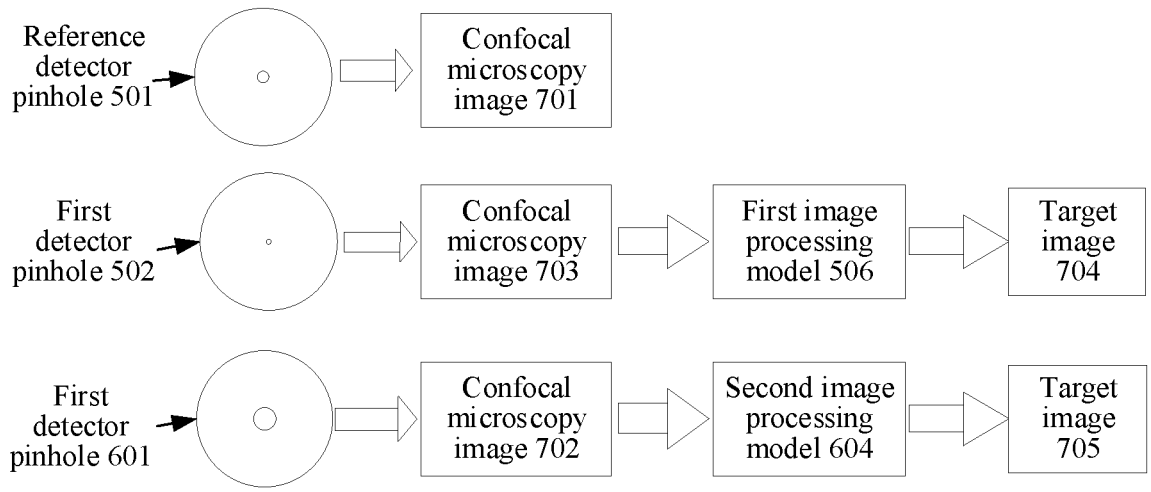
FIG. 7 is a schematic diagram of another AI-based image processing method according to an embodiment of this application.

FIG. 7 is a schematic diagram of another AI-based image processing method according to an embodiment of this application. As shown in FIG. 7, with the same light source and the same exposure time, a confocal microscopy image

701 may be obtained based on the reference detector pinhole 501. A confocal microscopy image 702 may be obtained based on the first detector pinhole 601 having a pinhole diameter larger than that of the reference detector pinhole 501. A confocal microscopy image 703 may be obtained based on the first detector pinhole 502 having a pinhole diameter smaller than that of the reference detector pinhole 501. The first image processing model 506 is used to process the confocal microscopy image 703, to obtain a target image 704. The second image processing model 604 is used to process the confocal microscopy image 702, to obtain a target image 705.

In this embodiment of this application, the detector pinhole with different diameters is configured for the confocal microscope, during image acquisition, the corresponding target image processing model may be selected for the pinhole diameter of the first detector pinhole in the usage state. Because the detector pinhole with different pinhole diameters can improve one of the resolution or the signal-to-noise ratio and reduce the other, when the resolution of the image is reduced and the signal-to-noise ratio of the image is improved due to the influence of the determined pinhole diameter, the target image processing model is used to process the confocal microscopy image, to improve the resolution of the image, so that both the resolution and the signal-to-noise ratio of the processed confocal microscopy image are improved, which can more accurately reflect the details of the sample. In another case, when the signal-to-noise ratio of the image is reduced and the resolution of the image is improved due to the influence of the determined pinhole diameter, the target image processing model is used to process the confocal microscopy image, to improve the signal-to-noise ratio of the image, so that both the resolution and the signal-to-noise ratio of the processed confocal microscopy image are improved. In this case, the details of the sample can also be more accurately reflected.

Figure 8:
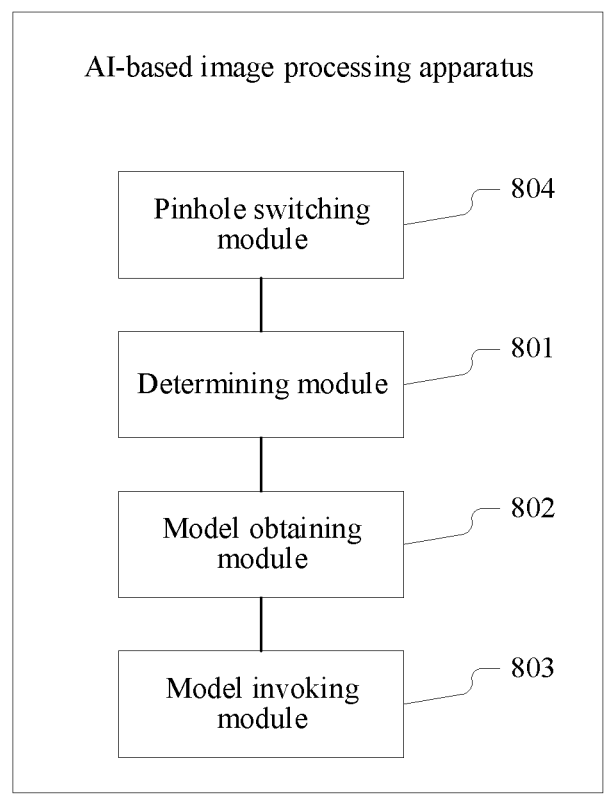
FIG. 8 is a block diagram of an AI-based image processing apparatus according to an embodiment of this application.

FIG. 8 is a block diagram of an AI-based image processing apparatus according to an embodiment of this application. The apparatus is configured to perform the steps in the execution of the AI-based image processing method. Referring to FIG. 8, the apparatus includes: a determining module 801, a model obtaining module 802, and a model invoking module 803.

The determining module 801 is configured to determine a pinhole diameter of a first detector pinhole of a confocal microscope in a usage state.

The model obtaining module 802 is configured to obtain a target image processing model corresponding to the pinhole diameter of the first detector pinhole, the target image processing model being configured to improve a resolution of an image when the resolution of the image is reduced and a signal-to-noise ratio of the image is improved due to the influence of a determined pinhole diameter, and the target image processing model being configured to improve the signal-to-noise ratio of the image when the signal-to-noise ratio of the image is reduced and the resolution of the image is improved due to the influence of the determined pinhole diameter; and The model invoking module 803 is configured to invoke the target image processing model to process a confocal microscopy image acquired by the confocal microscope, to obtain a target image.

In an implementation, the model obtaining module 802 is configured to obtain, in response that the pinhole diameter of the first detector pinhole is less than the target threshold, from at least one first image processing model configured to improve a signal-to-noise ratio, a first image processing model corresponding to the pinhole diameter of the first detector pinhole, and use the first image processing model as the target image processing model.

In an implementation, the model obtaining module 802 is configured to obtain, in response that the pinhole diameter of the first detector pinhole is greater than the target threshold, from at least one second image processing model configured to improve a resolution, a second image processing model corresponding to the pinhole diameter of the first detector pinhole, and use the second image processing model as the target image processing model.

In an implementation, the target image processing model is a first image processing model configured to improve the signal-to-noise ratio of the image.

The target image processing model is trained through the following operations: obtaining a first sample image pair, the first sample image pair including images of a same resolution obtained by respectively acquiring samples in a same field of view by using the first detector pinhole under different light source conditions, and the light source condition including at least one of brightness of a light source or an exposure time; inputting the first sample image pair into a to-be-trained image processing model, to obtain an outputted processing result; and in response to a training ending condition being satisfied, using the image processing model obtained through training as the target image processing model.

In an implementation, the target image processing model is a second image processing model configured to improve the resolution of the image.

The target image processing model is trained through the following operations: obtaining a second sample image pair, the second sample image pair including images of a same signal-to-noise ratio obtained by respectively acquiring samples in a same field of view by using the first detector pinhole and a second detector pinhole under different light source conditions, the pinhole diameter of the first detector pinhole being greater than a pinhole diameter of the second detector pinhole, and the light source condition including at least one of brightness of a light source or an exposure time; inputting the second sample image pair into a to-be-trained image processing model, to obtain an outputted processing result; and in response to a training ending condition being satisfied, using the image processing model obtained through training as the target image processing model.

In an implementation, the apparatus further includes:
a pinhole switching module 804, configured to control, in response to a pinhole switching instruction being detected, the confocal microscope to switch from a third detector pinhole to the first detector pinhole according to the pinhole switching instruction.

In this embodiment of this application, the detector pinhole with different diameters is configured for the confocal microscope, during image acquisition, the corresponding target image processing model may be selected for the pinhole diameter of the first detector pinhole in the usage state. Because the detector pinhole with different pinhole diameters can improve one of the resolution or the signal-to-noise ratio and reduce the other, when the resolution of the image is reduced and the signal-to-noise ratio of the image is improved due to the influence of the determined pinhole diameter, the target image processing model is used to process the confocal microscopy image, to improve the resolution of the image, so that both the resolution and the signal-to-noise ratio of the processed confocal microscopy image are improved, which can more accurately reflect the details of the sample. In another case, when the signal-tonoise ratio of the image is reduced and the resolution of the image is improved due to the influence of the determined pinhole diameter, the target image processing model is used to process the confocal microscopy image, to improve the signal-to-noise ratio of the image, so that both the resolution and the signal-to-noise ratio of the processed confocal microscopy image are improved. In this case, the details of the sample can also be more accurately reflected.

When an application program run on the AI-based image processing apparatus, the foregoing embodiment is merely described by using an example of dividing various functional modules. In actual application, the foregoing function allocation is completed by different functional modules according to needs, that is, the internal structure of the apparatus is divided into different functional modules, to complete all or a part of functions of the foregoing scanning. In addition, the AI-based image processing apparatus provided in the foregoing embodiment belongs to the same idea as the AI-based image processing method embodiment. For a specific implementation process, refer to the method embodiment. Details are not described herein again.

In the embodiments of this application, a computer device may be configured as a terminal or a server. When the computer device is configured as a terminal, the technical solutions provided in the embodiments of this application may be implemented by using the terminal as an execution entity, and when the computer device is configured as a server, the technical solutions provided in the embodiments of this application may be implemented by using the server as an execution entity, or the technical solutions provided in this application may be implemented through an interaction between the terminal and the server, which is not limited in the embodiments of this application.

Figure 9:
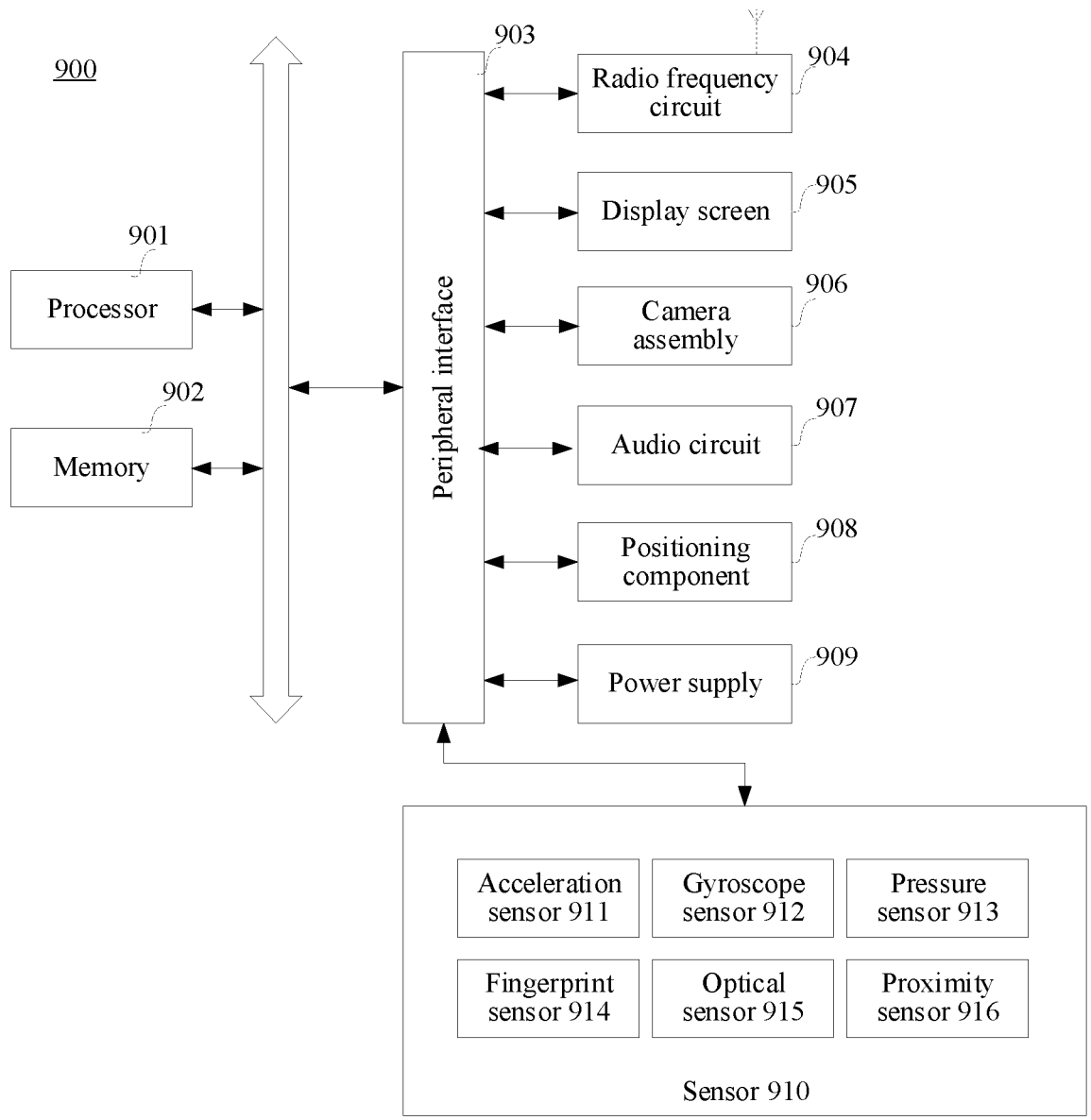
FIG. 9 is a structural block diagram of a terminal according to an embodiment of this application.

When the computer device is configured as a terminal, FIG. 9 is a structural block diagram of a terminal 900 according to an embodiment of this application. The terminal 900 may be a smartphone, a tablet computer, a Moving Picture Experts Group Audio Layer III (MP3) player, an MP4 player, a notebook computer, or a desktop computer. The terminal 900 may also be referred to as user equipment, a portable terminal, a laptop terminal, a desktop terminal or the like.

Generally, the terminal 900 includes a processor 901 and a memory 902.

The processor 901 may include one or more processing cores such as a 4-core processor or an 8-core processor. The processor 901 may be implemented by using at least one hardware form of digital signal processor (DSP), a field-programmable gate array (FPGA), and a programmable logic array (PLA). The processor 901 may alternatively include a main processor and a coprocessor. The main processor is a processor configured to process data in an active state, also referred to as a central processing unit (CPU). The coprocessor is a low-power processor configured to process data in a standby state. In some embodiments, the processor 901 may be integrated with a graphics processing unit (GPU). The GPU is configured to render and draw content that needs to be displayed on a display screen. In some embodiments, the processor 901 may further include an artificial intelligence (AI) processor. The AI processor is configured to process computing operations related to machine learning.

The memory 902 may include one or more computer-readable storage media. The computer-readable storage medium may be non-transient. The memory 902 may further include a high-speed random access memory and a non-volatile memory, such as one or more magnetic disk storage devices or a flash storage device. In some embodiments, a non-transitory computer-readable storage medium in the memory 902 is configured to store at least one instruction, the at least one instruction being configured to be executed by the processor 901 to implement the AI-based image processing method provided in the method embodiments of this application.

In some embodiments, the terminal 900 may further include: a peripheral interface 903 and at least one peripheral. The processor 901, the memory 902, and the peripheral interface 903 may be connected to each other by a bus or a signal cable. Each peripheral may be connected to the peripheral interface 903 by a bus, a signal cable, or a circuit board. Specifically, the peripheral includes: at least one of a radio frequency (RF) circuit 904, a touch display screen 905, a camera assembly 906, an audio circuit 907, a positioning component 908, and a power supply 909.

The peripheral interface 903 may be configured to connect at least one peripheral related to input/output (I/O) to the processor 901 and the memory 902. In some embodiments, the processor 901, the memory 902, and the peripheral interface 903 are integrated on the same chip or the same circuit board. In some other embodiments, any or both of the processor 901, the memory 902, and the peripheral interface 903 may be implemented on an independent chip or circuit board. This is not limited in this embodiment.

The RF circuit 904 is configured to receive and transmit an RF signal, which is also referred to as an electromagnetic signal. The RF circuit 904 communicates with a communication network and other communication devices through the electromagnetic signal. The RF circuit 904 converts an electrical signal into an electromagnetic signal for transmission, or converts a received electromagnetic signal into an electrical signal. The RF circuit 904 includes: an antenna system, an RF transceiver, one or more amplifiers, a tuner, an oscillator, a digital signal processor, a codec chip set, a subscriber identity module card, and the like. The RF circuit 904 may communicate with another terminal by using at least one wireless communication protocol. The wireless communication protocol includes, but is not limited to: a metropolitan area network, generations of mobile communication networks (2G, 3G, 4G, and 5G), a wireless local area network and/or a wireless fidelity (Wi-Fi) network. In some embodiments, the RF circuit 904 may further include a circuit related to near field communication (NFC), which is not limited in this application.

The display screen 905 is configured to display a user interface (UI). The UI may include a graph, a text, an icon, a video, and any combination thereof. When the display screen 905 is a touch display screen, the display screen 905 is further capable of collecting a touch signal on or above a surface of the display screen 905. The touch signal may be inputted, as a control signal, to the processor 901 for processing. In this case, the display screen 905 may be further configured to provide a virtual button and/or a virtual keyboard that are/is also referred to as a soft button and/or a soft keyboard. In some embodiments, there may be one display screen 905, disposed on a front panel of the terminal 900. In other embodiments, there may be at least two display screens 905 that are respectively disposed on different surfaces of the terminal 900 or folded. In still other embodiments, the display screen 905 may be a flexible display screen disposed on a curved surface or a folded surface of the terminal 900. Even, the display screen 905 may be further set to have a non-rectangular irregular pattern, that is, a special-shaped screen. The display screen 905 may be made of materials such as a liquid crystal display (LCD), and an organic light-emitting diode (OLED).

The camera assembly 906 is configured to capture an image or a video. The camera assembly 906 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, each being any one of a main camera, a depth-of-field camera, a wide-angle camera, and a telephoto camera, so as to implement a background blurring function by fusing the main camera with the depth-of-field camera, and implement panoramic shooting and virtual reality (VR) shooting functions or other fusing shooting functions by fusing the main camera with the wide-angle camera. In some embodiments, the camera assembly 906 may further include a flash. The flash may be a single color temperature flash or a double color temperature flash. The double color temperature flash is a combination of a warm light flash and a cold light flash, and may be used for light compensation under different color temperatures.

The audio circuit 907 may include a microphone and a speaker. The microphone is configured to collect sound waves of users and surroundings, and convert the sound waves into electrical signals and input the signals to the processor 901 for processing, or input the signals to the RF circuit 904 to implement voice communication. For the purpose of stereo collection or noise reduction, there may be a plurality of microphones, respectively disposed at different portions of the terminal 900. The microphone may be further an array microphone or an omni-directional collection type microphone. The speaker is configured to convert electrical signals from the processor 901 or the RF circuit 904 into acoustic waves. The speaker may be a conventional thin-film speaker or a piezoelectric ceramic speaker. When the speaker is the piezoelectric ceramic speaker, the speaker cannot only convert an electrical signal into sound waves audible to a human being, but also convert an electrical signal into sound waves inaudible to the human being for ranging and other purposes. In some embodiments, the audio circuit 907 may also include an earphone jack.

The positioning component 908 is configured to position a current geographic location of the terminal 900, to implement navigation or a location based service (LBS). The positioning component 908 may be a positioning component based on the Global Positioning System (GPS) of the United States, the BeiDou system of China, the GLONASS System of Russia, or the GALILEO System of the European Union.

The power supply 909 is configured to supply power to assemblies in the terminal 900. The power supply 909 may be an alternating current, a direct current, a primary battery, or a rechargeable battery. When the power supply 909 includes the rechargeable battery, the rechargeable battery may be a wired rechargeable battery or a wireless rechargeable battery. The rechargeable battery may be further configured to support a fast charge technology.

In some embodiments, the terminal 900 may also include one or more sensors 910. The one or more sensors 910 include, but are not limited to, an acceleration sensor 911, a gyroscope sensor 912, a pressure sensor 913, a fingerprint sensor 914, an optical sensor 915, and a proximity sensor 916.

A person skilled in the art may understand that a structure shown in FIG. 9 constitutes no limitation on the terminal 900, and the computer device may include more or fewer components than those shown in the figure, or combine some components, or use a different component deployment.

Figure 10:
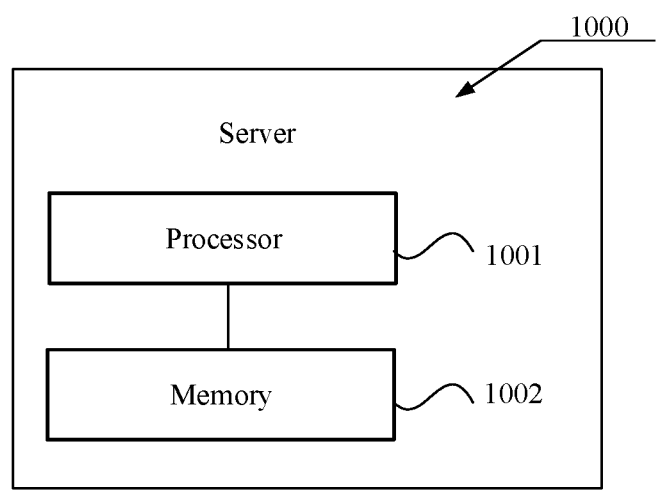
FIG. 10 is a schematic structural diagram of a server according to an embodiment of this application.

When the computer device is configured as a server, FIG. 10 is a schematic structural diagram of a server according to an embodiment of this application. The server 1000 may vary greatly due to different configurations or performance, and may include one or more CPUs 1001 and one or more memories 1002. The memory 1002 stores at least one instruction, the at least one instruction being loaded and executed by the processor 1001 to implement the AI-based image processing method provided in the foregoing method embodiments. Certainly, the server 1000 may also have a wired or wireless network interface, a keyboard, an input/output interface and other components to facilitate input/output. The server 1000 may also include other components for implementing device functions. Details are not described herein.

An embodiment of this application further provides a non-transitory computer-readable storage medium applicable to a computer device, the computer-readable storage medium storing at least one program code, the program code being loaded and executed by a processor to implement the operations performed by the computer device in the AI-based image processing method according to the embodiments of this application.

An embodiment of this application further provides an application program product, storing one or more instructions, the one or more instructions being executed by a processor of a computer device to implement the AI-based image processing method.

Those of ordinary skill in the art may understand that all or part of the steps of implementing the foregoing embodiments may be implemented by hardware, or may be implemented by a program instructing related hardware. The program may be stored in a computer-readable storage medium. The storage medium mentioned may be a read-only memory, a magnetic disk or an optical disc.

The foregoing descriptions are merely the embodiments of this application, but are not intended to limit this application. Any modification, equivalent replacement, or improvement made without departing from the spirit and principle of this application shall fall within the protection scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs model training and/or pinhole switching. In practical application, the foregoing functions may be allocated to and completed by different functional modules according to requirements, that is, an inner structure of a device is divided into different functional modules to implement all or a part of the functions described above.

What is claimed is:

1. An artificial intelligence (AI)-based image processing method, performed by a computer device, the method comprising:
obtaining a confocal microscopy image;
determining a pinhole diameter of a first detector pinhole of a confocal microscope that is used to acquire the image, wherein the pinhole diameter has an influence on a parameter of the image, the parameter being at least one of an image signal-to-noise ratio or an image resolution;
obtaining a target image processing model corresponding to the pinhole diameter of the first detector pinhole, wherein the target image processing model is configured to improve the parameter of the image and the target image processing model is trained using sample image pairs, the sample image pairs including a first sample image pair comprising images of a same resolution obtained by respectively acquiring samples in a same field of view by using the first detector pinhole under different light source conditions, the different light source conditions including different brightnesses of a light source or different exposure times; and
causing the target image processing model to process the image, to obtain a target image having the improved parameter.

2. The method according to claim 1, wherein obtaining the target image processing model corresponding to the pinhole diameter of the first detector pinhole comprises:
in accordance with a determination that the pinhole diameter of the first detector pinhole is less than a target threshold:
obtaining, from one or more image processing models configured to improve the image signal-to-noise ratio, a first image processing model corresponding to the pinhole diameter of the first detector pinhole; and
using the first image processing model as the target image processing model.

3. The method according to claim 1, wherein obtaining the target image processing model corresponding to the pinhole diameter of the first detector pinhole comprises:
in accordance with a determination that the pinhole diameter of the first detector pinhole is greater than a target threshold:
obtaining, from one or more image processing models configured to improve the image resolution, a second image processing model corresponding to the pinhole diameter of the first detector pinhole; and
using the second image processing model as the target image processing model.

4. The method according to claim 1, wherein:
the pinhole diameter causes a decrease in the image signal-to-noise ratio and an improvement in the image resolution; and
the target image processing model is configured to improve the signal-to-noise ratio of the image.

5. The method according to claim 1, wherein training the target image processing model includes:

inputting the first sample image pair into a to-be-trained image processing model, to obtain a processing result; and
in accordance with a determination that a training ending condition is satisfied:
determining that the to-be-trained image processing model is a trained processing model; and
using the trained processing model as the target image processing model.

6. The method according to claim 1, wherein:
the pinhole diameter causes a decrease in the image resolution and an improvement in the image signal-to-noise ratio; and
the target image processing model is configured to improve the resolution of the image.

7. The method according to claim 6, wherein training the target image processing model includes:
obtaining a second sample image pair, the second sample image pair comprising images of a same signal-to-noise ratio obtained by respectively acquiring samples in a same field of view by using the first detector pinhole and a second detector pinhole under different light source conditions, the pinhole diameter of the first detector pinhole being greater than a pinhole diameter of the second detector pinhole, and the light source conditions comprising at least one of: brightness of a light source or an exposure time;
inputting the second sample image pair into a to-be-trained image processing model, to obtain a processing result; and
in accordance with a determination that a training ending condition is satisfied:
determining that the to-be-trained image processing model is a trained processing model; and
using the trained processing model as the target image processing model.

8. The method according to claim 1, further comprising:
prior to determining the pinhole diameter of the first detector pinhole:
detecting a pinhole switching instruction; and
controlling the confocal microscope to switch from a third detector pinhole to the first detector pinhole according to the switching instruction.

9. A computer device, comprising:
one or more processors; and
memory storing one or more programs, the one or more programs comprising instructions that, when executed by the one or more processors, cause the one or more processors to perform operations comprising:
obtaining a confocal microscopy image;
determining a pinhole diameter of a first detector pinhole of a confocal microscope that is used to acquire the image, wherein the pinhole diameter has an influence on a parameter of the image, the parameter being at least one of an image signal-to-noise ratio or an image resolution;
obtaining a target image processing model corresponding to the pinhole diameter of the first detector pinhole, wherein the target image processing model is configured to improve the parameter of the image and the target image processing model is trained using sample image pairs, the sample image pairs including a first sample image pair comprising images of a same resolution obtained by respectively acquiring samples in a same field of view by using the first detector pinhole under different light source conditions, the different light source conditions including different brightnesses of a light source or different exposure times; and causing the target image processing model to process the image to obtain a target image having the improved parameter.

10. The computer device according to claim 9, wherein obtaining the target image processing model corresponding to the pinhole diameter of the first detector pinhole comprises:

in accordance with a determination that the pinhole diameter of the first detector pinhole is less than a target threshold:

obtaining, from one or more image processing models configured to improve the image signal-to-noise ratio, a first image processing model corresponding to the pinhole diameter of the first detector pinhole; and using the first image processing model as the target image processing model.

11. The computer device according to claim 9, wherein obtaining the target image processing model corresponding to the pinhole diameter of the first detector pinhole comprises:

in accordance with a determination that the pinhole diameter of the first detector pinhole is greater than a target threshold:

obtaining, from one or more image processing models configured to improve the image resolution, a second image processing model corresponding to the pinhole diameter of the first detector pinhole; and using the second image processing model as the target image processing model.

12. The computer device according to claim 9, wherein:

the pinhole diameter causes a decrease in the image signal-to-noise ratio and an improvement in the image resolution; and the target image processing model is configured to improve the signal-to-noise ratio of the image.

13. The computer device according to claim 9, wherein training the target image processing model includes:

inputting the first sample image pair into a to-be-trained image processing model, to obtain a processing result; and in accordance with a determination that a training ending condition is satisfied:

determining that the to-be-trained image processing model is a trained processing model; and using the trained processing model as the target image processing model.

14. The computer device according to claim 9, wherein:

the pinhole diameter causes a decrease in the image resolution and an improvement in the image signal-to-noise ratio; and the target image processing model is configured to improve the resolution of the image.

15. The computer device according to claim 14, wherein training the target image processing model includes:

obtaining a second sample image pair, the second sample image pair comprising images of a same signal-to-noise ratio obtained by respectively acquiring samples in a same field of view by using the first detector pinhole and a second detector pinhole under different light source conditions, the pinhole diameter of the first detector pinhole being greater than a pinhole diameter of the second detector pinhole, and the light source conditions comprising at least one of: brightness of a light source or an exposure time;

inputting the second sample image pair into a to-be-trained image processing model, to obtain a processing result; and in accordance with a determination that a training ending condition is satisfied:

determining that the to-be-trained image processing model is a trained processing model; and using the trained processing model as the target image processing model.

16. The computer device according to claim 9, the operations further comprising:

prior to determining the pinhole diameter of the first detector pinhole:

detecting a pinhole switching instruction; and controlling the confocal microscope to switch from a third detector pinhole to the first detector pinhole according to the switching instruction.

17. A non-transitory computer-readable storage medium, storing a computer program, the computer program, when executed by one or more processors of a computer device, cause the one or more processors to perform operations comprising:

obtaining a confocal microscopy image;

determining a pinhole diameter of a first detector pinhole of a confocal microscope that is used to acquire the image, wherein the pinhole diameter has an influence on a parameter of the image, the parameter being at least one of an image signal-to-noise ratio or an image resolution;

obtaining a target image processing model corresponding to the pinhole diameter of the first detector pinhole, wherein the target image processing model is configured to improve the parameter of the image and the target image processing model is trained using sample image pairs, the sample image pairs including a first sample image pair comprising images of a same resolution obtained by respectively acquiring samples in a same field of view by using the first detector pinhole under different light source conditions, the different light source conditions including different brightnesses of a light source or different exposure times; and causing the target image processing model to process the image to obtain a target image having the improved parameter.

18. The non-transitory computer-readable storage medium according to claim 17, wherein obtaining the target image processing model corresponding to the pinhole diameter of the first detector pinhole comprises:

in accordance with a determination that the pinhole diameter of the first detector pinhole is less than a target threshold:

obtaining, from one or more image processing models configured to improve the image signal-to-noise ratio, a first image processing model corresponding to the pinhole diameter of the first detector pinhole; and using the first image processing model as the target image processing model.

19. The non-transitory computer-readable storage medium according to claim 17, wherein obtaining the target image processing model corresponding to the pinhole diameter of the first detector pinhole comprises:

in accordance with a determination that the pinhole diameter of the first detector pinhole is greater than a target threshold:

obtaining, from one or more image processing models configured to improve the image resolution, a second image processing model corresponding to the pinhole diameter of the first detector pinhole; and using the second image processing model as the target image processing model.

20. The non-transitory computer-readable storage medium according to claim 17, the operations further comprising:

prior to determining the pinhole diameter of the first detector pinhole:
detecting a pinhole switching instruction; and
controlling the confocal microscope to switch from a third detector pinhole to the first detector pinhole according to the switching instruction.

* * * * *